(12) United States Patent
Gutierrez et al.

(10) Patent No.: US 6,738,177 B1
(45) Date of Patent: May 18, 2004

(54) SOFT SNAP-DOWN OPTICAL ELEMENT USING KINEMATIC SUPPORTS

(75) Inventors: Roman C. Gutierrez, La Crescenta, CA (US); Tony K. Tang, Glendale, CA (US); Cathleen Jones, Alhambra, CA (US); Robert J. Calvet, Pasadena, CA (US)

(73) Assignee: Siwave, Inc., Arcadia, CA (US)

( * ) Notice: Subject to any disclaimer, the term of this patent is extended or adjusted under 35 U.S.C. 154(b) by 167 days.

(21) Appl. No.: 09/948,176

(22) Filed: Sep. 5, 2001

Related U.S. Application Data
(60) Provisional application No. 60/229,757, filed on Sep. 5, 2000.

(51) Int. Cl.[7] ............................................. G02B 26/08
(52) U.S. Cl. ...................................... 359/298; 359/214
(58) Field of Search ............................. 359/298, 295, 359/223, 224, 214

(56) References Cited

U.S. PATENT DOCUMENTS 5,212,582 A * 5/1993 Nelson ........................ 359/224
5,673,139 A 9/1997 Johnson
6,014,240 A 1/2000 Floyd et al. ................ 359/201
6,044,705 A 4/2000 Neukermans et al.
6,529,310 B1 * 3/2003 Huibers et al. ............ 359/291

FOREIGN PATENT DOCUMENTS

| DE | 42 24 601 A 1 | 7/1992 |
|---|---|---|
| DE | 198 00 746 A 1 | 1/1998 |
| EP | 0 539 889 A2 | 10/1992 |
| WO | WO 95/03562 | 7/1994 |

* cited by examiner

Primary Examiner—Scott J. Sugarman
Assistant Examiner—Richard Hanig
(74) Attorney, Agent, or Firm—MacPherson Kwok Chen & Heid LLP; Jon W. Hallman

(57) ABSTRACT

The snapped-down position of an optical element is defined by its contact with a plurality of kinematic supports on an associated platform, or on electrodes placed on that platform. Compliant flexures may be provided in association with one or more kinematic supports, such that fine adjustments of the optical element can be made by deflecting the optical element to cause compression of one or more flexures.

48 Claims, 6 Drawing Sheets

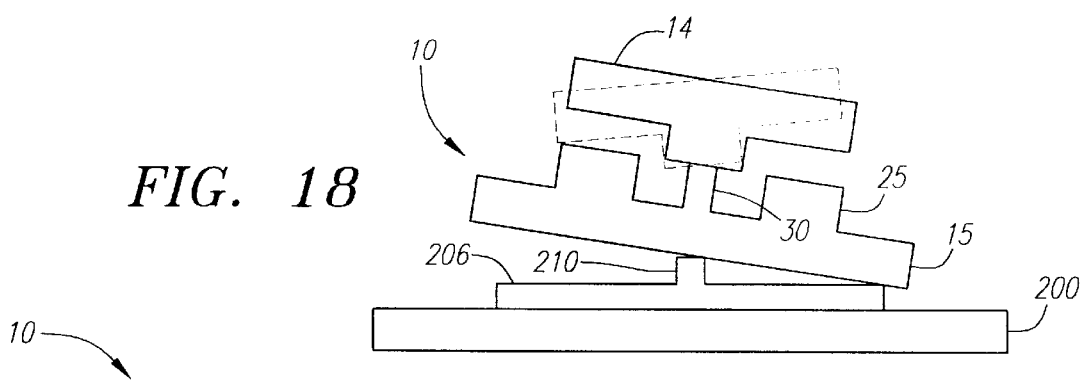
FIG. 18
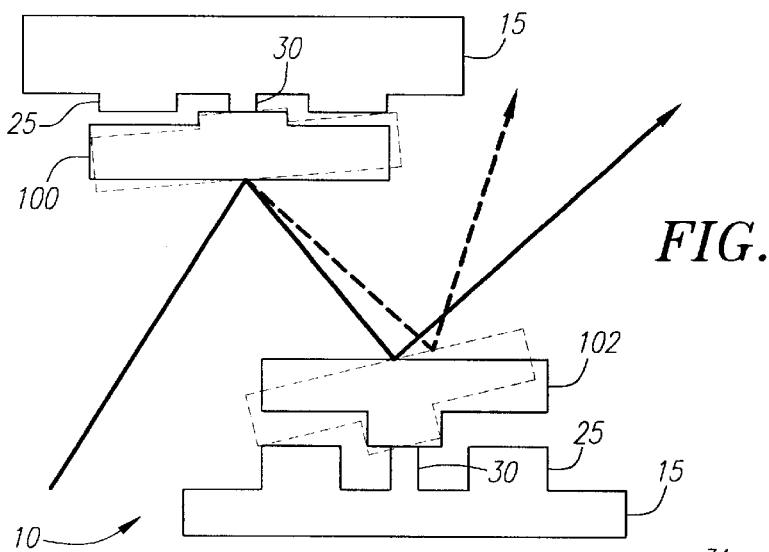
FIG. 19
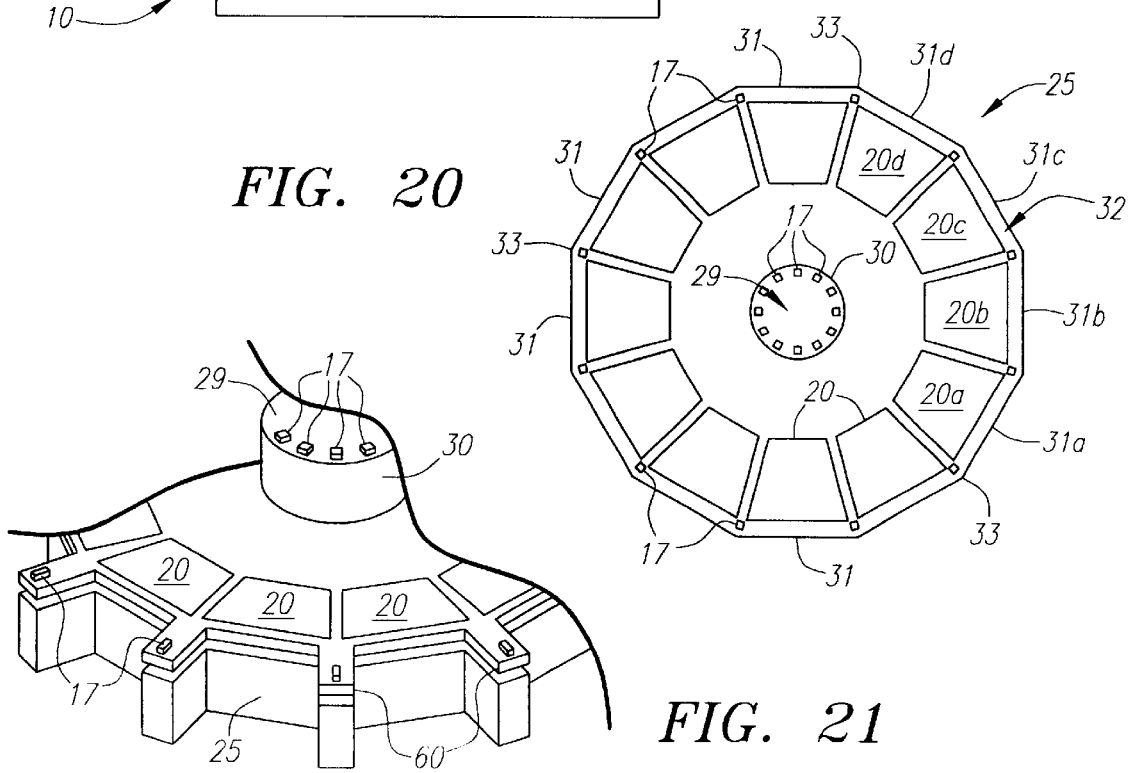
FIG. 20
FIG. 21

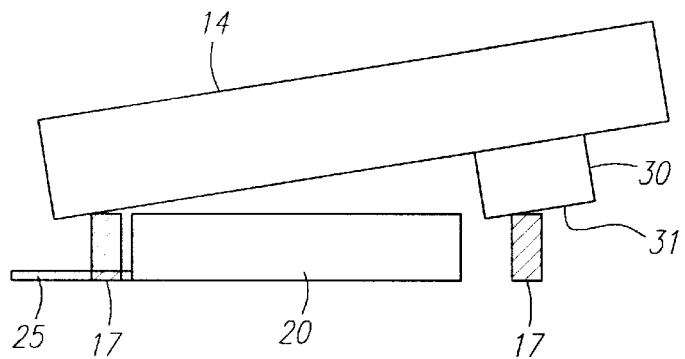
FIG. 22
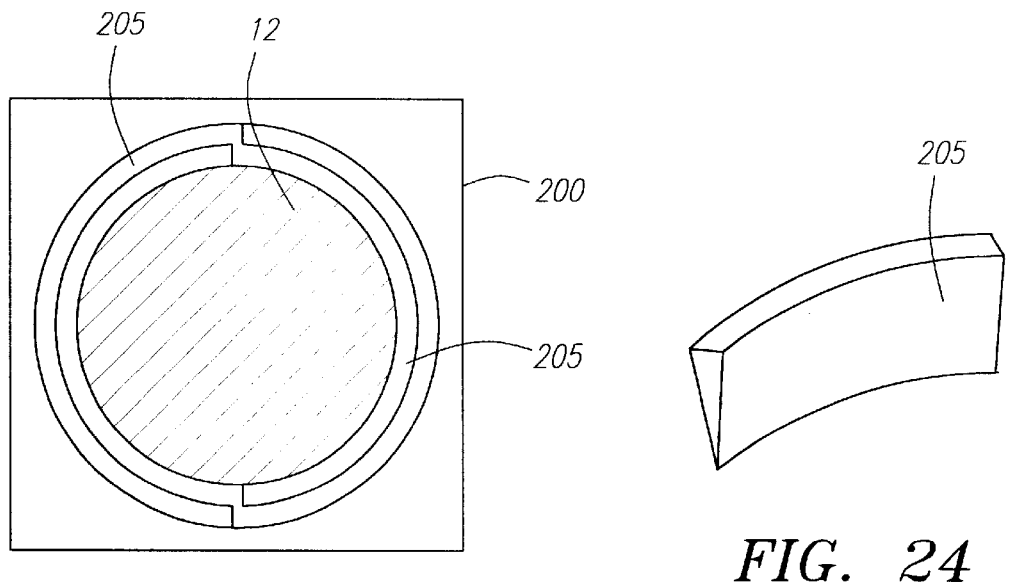
FIG. 23
FIG. 24
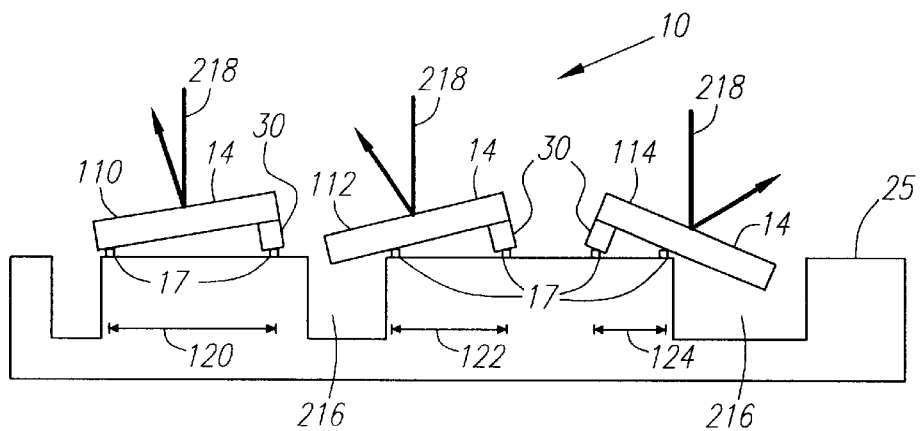
FIG. 25

SOFT SNAP-DOWN OPTICAL ELEMENT USING KINEMATIC SUPPORTS

RELATED APPLICATIONS

This application claims priority to the commonly-owned provisional patent application entitled "Soft Snap-Down Mirror for Optical Switch", Ser. No. 60/229,757, filed Sep. 5, 2000.

FIELD OF INVENTION

The invention relates generally to optics, and more particularly to a pivoting element for optical applications.

BACKGROUND

Optical switches have numerous applications for optical networks in areas such as cross-connects. Micro-electromechanical system (MEMS) optical mirrors have been developed for use in such switches. MEMS devices are fabricated using photolithographic techniques similar to those developed for mass production of semiconductor integrated circuits.

In a conventional MEMS optical switch, as seen for example in U.S. Pat. No. 6,044,705, electrostatic forces are used to pivot a suspended mirror in a desired direction. In this manner, the mirror may direct light beams at a desired angle. For accurate optical switching, however, the mirror should be pivoted very precisely so that the desired angle(s) may be achieved repeatedly with high precision. The resulting angle is determined by the balance between the applied electrostatic force and the spring restoring force applied by the mirror's suspension. This balance drifts with variations both in temperature and in stress. To prevent the drift from affecting desired results, complicated feedback circuitry is often necessary to control the direction of the mirror.

To address the need for accurate and repeatable positioning of the mirror for optical switching, U.S. Pat. No. 6,212,309 discloses a suspended rectangular mirror that pivots on its axis in the familiar manner of a playground seesaw. Just as a seesaw's pivoting motions is stopped in the same position when it contacts the ground, the disclosed rectangular mirror will come to rest at the same angle when it is fully deflected against its substrate. This mirror also suffers from certain disadvantages. For example, it has only two fully deflected positions, and is thus limited in the number of angles in which it can direct light when in the fully deflected position.

Copending U.S. patent application Ser. No. 09/870,967, entitled "Snap-Down Pivoting Optical Element," discloses a snap-down mirror supported by a pillar, where that mirror tilts on the upper surface of that pillar. The pillar extends upward from a platform, which in turn rests on a substrate. The platform is polygonal, having a perimeter composed of a number of micromachined linear segments. When the mirror is fully deflected, it contacts a linear segment at the edge of the platform. In this way, the mirror comes to rest in a fully deflected position in a plane defined by the linear segment of the platform contacted by the mirror and the point on the upper surface of the pillar contacting the mirror. The snap-down mirror can deflect light in a number of different angles, each corresponding to a different linear segment of the perimeter of the platform.

For snap-down mirrors as described above, the angle of the mirror in the snap-down position is defined by the pivot point of the mirror and a contact line between the mirror and the substrate. That is, the plane of the mirror is defined by the center pivot point and a linear segment along which the mirror and the substrate contact one another. The contact line may extend across a substantially linear edge of the mirror that contacts the surface of the substrate, or across a substantially linear edge of the substrate that contacts the underside of the mirror. The accuracy with which the snap-down mirror can be positioned is limited by the accuracy with which the contact surfaces are micromachined. However, even with accurate micromachining, the edges of the mirror and the surface of the substrate are rough at a microscopic level. Microscopic ridges, voids and other defects may be present on the mirror, substrate or both at the point of contact between the two. As a result, the contact between the mirror and the substrate can result in inaccurate positioning between them. For example, microscopic ridge defects along the line of contact between the mirror edge and the surface of the substrate result in contact occurring at that ridge, rather than along the surface of the substrate. As a result, the mirror does not snap down to the expected position, because the ridge defect prematurely stops the deflection of the mirror. Further, the surfaces of the mirror and/or substrate may wear down after numerous contacts between them, thereby reducing the repeatability of the mirror position. For example, a defect present on the substrate may snap off after months of operation of the snap-down mirror, such that the angle of the mirror in the snapped-down position changes.

Further, fine adjustments to the angle of the mirror are not possible, because the angle of the mirror after deflection is purely determined by the pivot point of the mirror and the points of contact between the mirror and the platform. Thus, the mirror cannot be adjusted to compensate for slight deviations of mirror angle that may result from, among other sources, micromachining defects on the mirror.

Additionally, snap-down mirrors as described above may be vulnerable to interruption in operations as a result of particulate matter or debris entering the vicinity of the mirror. Such debris can drift between the mirror and the substrate, such that the mirror snaps down onto the debris instead of the substrate. When this happens, the mirror does not snap down to its expected position, and a switching error may occur. Because contact between the mirror and the substrate takes place along a contact line, the presence of debris anywhere along that contact line can result in a switching error.

Finally, snap-down mirrors as described above are designed to overcome significant stiction effects resulting from contact between the mirror and the substrate. Stiction is the unintentional adhesion of MEMS surfaces, and can result from one or more factors such as surface tension, electrostatic forces, van der Waals forces, humidity-driven capillary forces, and other factors. The stiction force between two MEMS surfaces is the force required to separate the two surfaces after they are brought into contact with each other, and this force increases as the area of contact between the two surfaces increases. Thus, the substantially linear contact area between the mirror and the substrate may be large enough to result in substantial stiction force that cannot be overcome easily, if at all.

Accordingly, there is a need in the art for a MEMS pivoting element that can accurately and repeatedly position itself in a plurality of directions.

SUMMARY

A plurality of kinematic supports in conjunction with a snap-down mirror and n underlying platform allow for control of the mirror angle.

In one aspect of the invention, a snap-down mirror is supported on a pivot point that extends upward from a platform, where the platform is placed on a baseplate. One or more electrodes are located on the upper surface of the platform, and at least one kinematic support is placed on each electrode. The kinematic supports are nonconductive, to prevent grounding through them. The kinematic supports are photolithographically defined or otherwise constructed. One or more corresponding kinematic supports may be provided on the upper surface of the pivot point. When the mirror is snapped down, two kinematic supports on the platform and a kinematic support on the pivot point contact the mirror, thereby forming a plane defined by the points of contact between the mirror and the three kinematic supports. Thus, the manufacturing tolerances of the linear segments of the platform can be relaxed, and the angles defined between the mirror and the substrate can be controlled more accurately.

In another aspect of the invention, the kinematic supports project from the platform, separate from the electrodes. The kinematic supports can be electrically biased to a different potential than the electrodes. In this way, a higher voltage can be applied to the electrodes without electrical breakdown from an electrode to the mirror through a kinematic support.

In another aspect of the invention, a plurality of kinematic supports are placed on the snap-down mirror, instead of on the electrodes, platform or pivot point. When the mirror is snapped down, the kinematic supports on the mirror contact the platform and/or an electrode on the platform, as well as the pivot point, thereby forming a plane defined by the three kinematic supports.

In another aspect of the invention, a compliant flexure is provided at one or more points on the platform. Each flexure is provided under a kinematic support, and allows for a degree of compression. Thus, fine changes in the angle of the mirror may be made by deflecting the mirror, then exerting a small additional amount of force on the mirror, as by changing the voltage on one or more electrodes on the substrate. In this way, the flexures allow the mirror to move in response to the additional force, such that fine adjustment can be provided as needed.

In another aspect of the invention, one or more kinematic supports may be moved a selected amount by the application of an actuation force, without the use of flexures. Such an actuation force may be a piezoelectric force, generated by applying voltage to a piezoelectric layer placed underneath a kinematic support. In this way, actuation force is applied to the mirror when it is snapped down onto that kinematic support.

In another aspect of the invention, the platform is sloped downward from the central pillar, where the platform includes one or more discrete facets. One or more electrodes are located on each facet. By providing a sloped platform, the distance between the snap-down mirror and the platform is reduced, thereby reducing the voltage required to snap down the mirror.

BRIEF DESCRIPTION OF THE DRAWINGS

FIG. 18 is a side view of a stacked pivoting element.

FIG. 19 is a side view of two separate pivoting elements utilized in conjunction.

FIG. 20 is a plan view of another embodiment of the platform of FIG. 1.

FIG. 21 is a perspective view of the pivotable element of the embodiment shown in FIG. 20.

FIG. 22 is a side view of another embodiment of the pivotable element of FIG. 20.

FIG. 23 is a top view of a mirror element held within a suspension.

FIG. 24 is a partial perspective view of a spring used in the suspension of FIG. 23.

FIG. 25 is a side view of an embodiment of an element having a number of fixed mirrors kinematically positioned.

Use of the same or similar reference numbers in different figures indicates the same or like elements.

DETAILED DESCRIPTION

Figure 1:
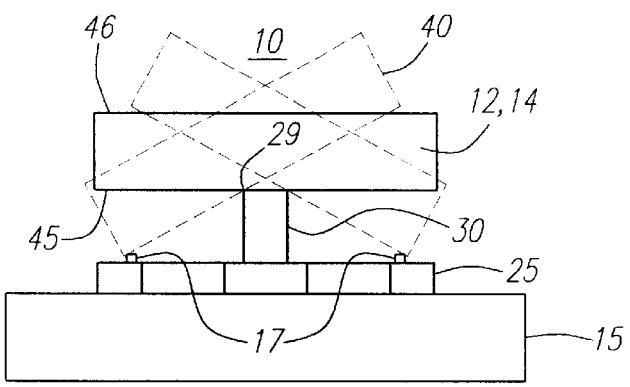
FIG. 1 is a side view of a pivotable element including a baseplate forming a platform.
Figure 2:
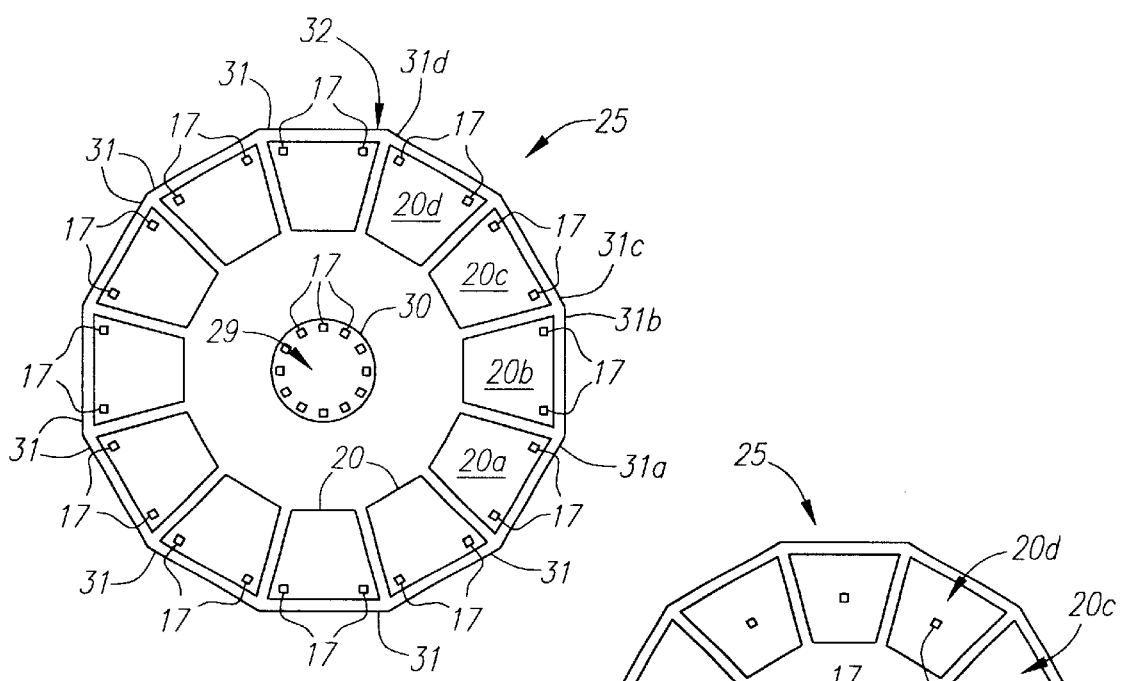
FIG. 2 is a plan view of the platform of FIG. 1.
Figure 4:
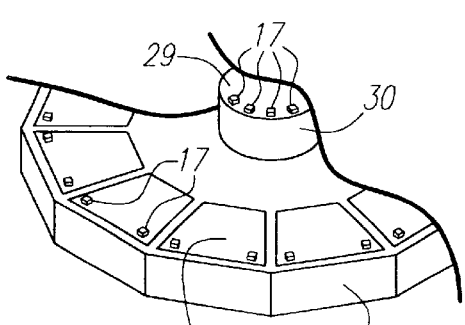
FIG. 4 is a perspective view of a portion of an optical element.

Referring to FIGS. 1, 2 and 4, an embodiment of a pivoting element 10 is shown. An optical element 12 is suspended above a baseplate 15, allowing the element 12 to respond to electrostatic forces produced by electrodes 20. The optical element 12 is substantially circular as viewed from above. However, the optical element 12 may take other shapes, if desired. The optical element 12 has an upper surface 46 that may be adapted to serve many different optical functions. For example, the surface 46 of the element 12 may be metallized to form element 12 into a mirror. Alternatively, the surface 46 of the element 12 could receive a grating, multiple dielectric coatings with or without wavelength dependence, or one or more holographic elements. In addition, active optical elements such as liquid crystals, lasers, detectors, modulators, or gain elements may be formed or mounted on the surface 46 of the element 12 or combined with other elements. Although the following description will discuss an optical element 12 having its surface 46 metallized to form a mirror element 14, it will be appreciated that other types of optical elements 12 may be utilized.

A platform 25 is formed on the baseplate 15. The arrangement of electrodes 20 on the upper surface of the platform 25 is shown in FIG. 2. A pillar 30 extends from the platform 25 to the mirror 14. The pillar 30 acts as a pivot point about which the mirror 14 can pivot. Because the pillar 30 and the mirror 14 are doped or otherwise treated or formed to be electrically conducting, a ground electrode on platform 25 that couples to the pillar 30 also grounds the mirror 14. Thus, the mirror 14 is normally grounded. As a result, when one or more electrodes 20 are given a charge, the mirror 14 will pivot and "snap down", assuming a position such as indicated by the dotted line 40 in FIG. 1.

Alternately, the ground electrode carries a voltage, such that the mirror 14 is biased at a non-zero voltage. The difference in voltage between the mirror 14 and one or more electrodes 20 is utilized to snap down the mirror 14. Further, when the mirror 14 is in a snapped-down position, the mirror 14 can be biased to a voltage that causes it to move away from one or more electrodes 20.

Figure 3:
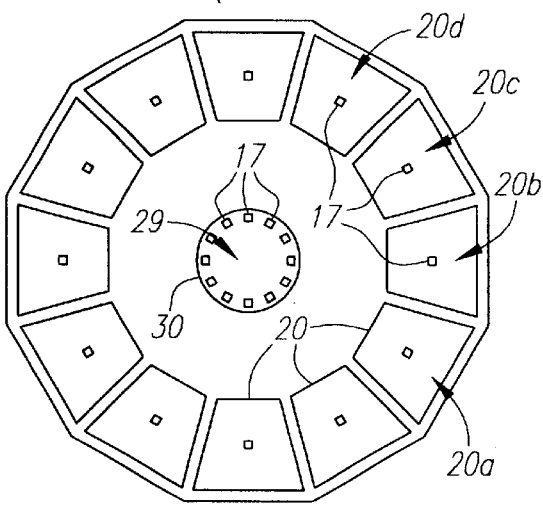
FIG. 3 is a plan view of another embodiment of the platform of FIG. 1.

Two nonconductive kinematic supports 17 are placed on each electrode 20. The kinematic supports 17 are nonconductive, and are formed from oxide. That is, the kinematic supports 17 are oxide bumps formed on silicon electrodes 20. However, other nonconductive materials may be used; advantageously, those materials have an electrical breakdown voltage of about 500 V/micron. The kinematic supports 17 are rectangular solids extending upward from each electrode 20, where the upper surface of each kinematic support 17 is substantially flat. The upper surface of each kinematic support 17 is raised relative to the surface of the corresponding electrode 20. Because each electrode 20 is deposited on the platform, the upper surface of each kinematic support 17 is raised relative to the surface of the platform 25 as well. Each kinematic support 17 may have substantially the same height as the other kinematic supports 17, or the kinematic supports 17 may have different heights. These rectangular solids may be shorter than they are wide, such that they form rectangular pads on the electrodes 20. The kinematic supports 17 may take other shapes, such as cylinders, triangular solids, polygonal solids, hemispheres, or other shapes. The kinematic supports 17 may have rounded edges, if desired. Each such kinematic support 17 has a substantially equal maximum height relative to the surface of the platform 25. Alternately, the kinematic supports 17 may have different heights. The kinematic supports 17 are photolithographically defined on the electrodes 20. However, the kinematic supports 17 may be constructed or defined with one or more other or additional MEMS fabrication processes. The kinematic supports 17 are nonconductive oxide bumps on the surface of the electrodes 20. Alternately, the kinematic supports 17 are formed from a different nonconductive material. Because the mirror 14 contacts two kinematic supports 17 associated with a single electrode 20, the mirror 14 can be snapped down by energizing only one electrode 20. Alternately, referring to FIG. 3, each electrode 20 has one kinematic support 17 defined thereon. Consequently, two neighboring electrodes 20 are used to snap down the mirror 14 because the mirror 14 contacts two kinematic supports 17 associated with two different electrodes 20.

Referring to FIG. 4, a number of kinematic supports 17 are also provided on the upper surface 29 of the pillar 30. The number of kinematic supports 17 may be the same as the number of electrodes 20 on the platform 25. That is, the number of positions that may be assumed by the mirror 14 is equal to the number of electrodes 20, and a different kinematic support 17 is provided on the upper surface 29 of the pillar 30 for each such position. The upper surface of each kinematic support 17 is raised relative to the upper surface 29 of the pillar 30. The height of each kinematic support 17 on the upper surface 29 of the pillar 30 may be substantially the same, or their heights may be different with respect to one another. Further, the height of each kinematic support 17 on the upper surface 29 of the pillar may be substantially the same as the height of the kinematic supports 17 on the electrodes 20, or may be different from the height of the kinematic supports 17 on the electrodes 20. The properties of and the formation of the kinematic supports 17 on the upper surface 29 of the pillar 30 are substantially as described above. The height of the kinematic supports 17 is exaggerated in the figures for clarity in showing their location and describing their function.

Figure 5:
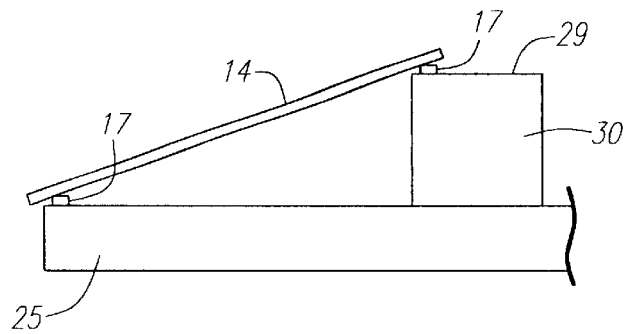
FIG. 5 is a side view of a portion of one embodiment of the pivotable element.
Figure 6:
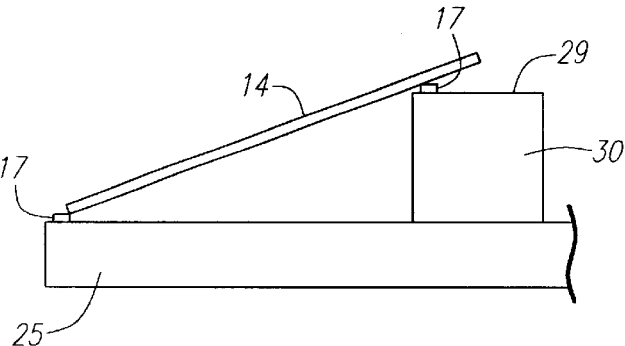
FIG. 6 is a side view of a portion of a second embodiment of the pivotable element.
Figure 7:
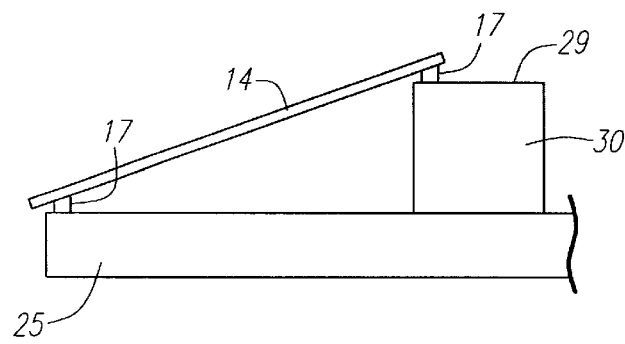
FIG. 7 is a side view of a portion of a third embodiment of the pivotable element.

Referring to FIGS. 1, 2 and 5, the mirror 14 is snapped down onto an electrode 20 having two kinematic supports 17 thereon. For clarity, only the particular kinematic supports 17 utilized are shown in FIG. 5. The two kinematic supports 17 on the electrode 20 prevent both physical and electrical contact between the mirror 14 and the electrode 20. When the mirror 14 is snapped down, its underside contacts a kinematic support 17 on the upper surface 29 of the pillar 30, and additionally contacts two kinematic supports 17 on the electrode 20. The upper surface of each kinematic support 17 is substantially flat and substantially parallel to the upper surface of the platform 25. As described above, the upper surface of each kinematic support 17 is substantially rectangular, and oriented such that one of its centerlines intersects the centerline of the pillar 30. As a result, when the mirror 14 snaps down, its underside contacts one edge of three different kinematic supports 17: one on the upper surface 29 of the pillar 30 and two on the upper surface of the electrode 20. That is, the kinematic supports 17 are oriented, and micromachined, such that the underside of the mirror 14 contacts one edge of each of three kinematic supports 17. Thus, the snapped-down position of the mirror 14, and the angle between the mirror 14 and the platform 25, are defined by the contacts between its underside and the three separate kinematic supports 17. That is, each contact between the mirror 14 and a kinematic support 17 is small enough to be considered a point contact, and the mirror 14 assumes a planar position defined by the three points of contact between it and the kinematic supports 17. The snapped-down position of the mirror 14 can thus be selected at the time the pivoting element 10 is constructed, by selecting the relative placement of the kinematic supports 17 and the height of those kinematic supports 17.

The edge of the upper surface of each kinematic support 17 that contacts the mirror 14 is machined or otherwise formed to ensure that its contact with the mirror 14 is precisely known and reproducible. Similarly, the underside of the mirror 14 is machined or otherwise formed to ensure that its contacts with the kinematic supports 17 are precisely known and reproducible. The accuracy and precision of achieving a desired position of the upper surface 46 of the mirror 14 is thus controlled by the precision of micromachining the upper surface of each kinematic support 17. Because MEMS technology allows an accurate micromachining of these factors, the desired position of the upper surface 46 of the mirror 14 may be accurately defined and repeatedly achieved by a user.

By snapping down the mirror 14 onto three kinematic supports 17, rather than onto a pivot point and one of the linear segments 31 of the platform 25, several advantages may be obtained. By defining three kinematic supports 17 as the three points of contact with the mirror 14, the error tolerance of the platform 25 and the upper surface 29 of the pillar 30 at locations apart from the kinematic supports 17 can be relaxed. In this way, manufacturing of the pivoting element 10 is simplified, and production yields may be increased. For the same reason, manufacturing tolerances can be relaxed along the linear segments 31 of the platform 25. Further, no feedback circuitry is required to produce an accurate and reproducible set of snapped-down positions of the mirror 14. In addition, the susceptibility of the pivoting element 10 to debris is reduced, as debris smaller than the height of the kinematic supports 17 does not affect the performance of the pivoting element 10 unless that debris is present on one or more kinematic supports 17.

Referring to FIGS. 1, 2, 4 and 6, in another embodiment, the mirror 14 is sized such that, upon snapdown, an edge of the mirror 14 contacts the upper surface of the kinematic supports 17 on the electrode 20. The underside of the mirror 14 contacts an edge of the upper surface of the kinematic support 17 on the upper surface 29 of the pillar 30. This embodiment is more sensitive to the position of the mirror 14 than the previous embodiment. That is, the edge of the mirror 14 must line up with the upper surface of each kinematic support 17 in order to snap down to the appropriate position, such that increased precision in positioning of the mirror 14 is needed. In contrast, the previous embodiment is more tolerant of deviation in the positioning of the mirror 14, because the mirror 14 can shift laterally and still contact the edge of each kinematic support 17.

Referring to FIGS. 1, 2, 4 and 7, in another embodiment, when the mirror 14 is snapped down, its underside contacts a kinematic support 17 on the upper surface 29 of the pillar 30, and additionally contacts two kinematic supports 17 on the electrode 20. The upper surface of each kinematic support 17 is angled. As a result, when the mirror 14 snaps down, its underside contacts substantially the entire upper surface of three different kinematic supports 17: one on the upper surface 29 of the pillar 30 and two on the electrode 20. That is, the kinematic supports 17 are oriented, and micromachined, such that the underside of the mirror 14 contacts the upper surface of each of three kinematic supports 17. The mirror 14 comes to rest at an angle, in a planar orientation defined by its contacts with the three separate kinematic supports 17.

As seen in FIG. 2, the perimeter 32 of platform 25 may have a polygonal shape, wherein each linear segment 31a, 31b, etc., corresponds to a particular electrode 20 on the platform 25. For example, if a charge exists on electrode 20a, the mirror element 14 will fully deflect toward linear segment 31a, snapping down onto the kinematic supports 17 on the electrode 20a. Similarly, if a charge exists on electrode 20b, the mirror element 14 will fully deflect toward linear segment 31b, snapping down onto the kinematic supports 17 on electrode 20b, and so on. Thus, the mirror element 14 may fully deflect against each set of two kinematic supports 17 on an electrode 20 associated with a particular linear segment 31 when that electrode 20 has been energized. The position of the mirror 14 may be determined electrically, by determining which kinematic supports 17 are in contact with the mirror 14 when the mirror 14 is in a snapped down position. In this way, the snapped-down position of the mirror 14 can be confirmed. Determining the position of the mirror 14 may be performed by detecting current flow across the mirror 14 when it is in contact with the kinematic supports 17 in the snapped-down position, or in another manner.

To move the mirror element from being fully deflected against any particular set of two kinematic supports 17 on one electrode 20 to being fully deflected against another set of two kinematic supports 17 on another electrode 20, the intervening electrodes 20 are energized in succession, stopping at the electrode 20 corresponding to the desired position of the mirror 14. For example, to move the mirror element 14 from being fully deflected (that is, snapped down) against the two kinematic supports 17 on the electrode 20a to become fully deflected against the two kinematic supports 17 on the electrode 20d, a number of electrodes 20 are charged and grounded in sequence. First, electrode 20b is charged and electrode 20a grounded. Then, electrode 20c is charged and electrode 20b grounded. Next, electrode 20d is charged and electrode 20c grounded. In this fashion, the mirror element would be fully deflected, in succession, against the two kinematic supports 17 on each of electrodes 20a, 20b, 20c, and 20d. The resulting motion of the mirror element 14 is analogous to that of a spinning coin just before it comes to rest or a top rolling about its pivot.

Where one kinematic support 17 is provided on each electrode 20, the mirror 14 is snapped down in a similar manner. Referring back to FIG. 3, two neighboring electrodes 20 are utilized to snap down the mirror 14 into a desired position over a portion of each of two neighboring electrodes 20. As an example, to move the mirror 14 to be fully deflected against the kinematic supports 17 on electrodes 20a and 20b, both electrodes 20a and 20b are charged. The snapped-down position of the mirror 14 is offset from the position the mirror 14 would take in the embodiment in which two kinematic supports 17 are utilized. To move the mirror element from being fully deflected against any particular set of two kinematic supports 17 on a set of two electrodes 20 to being fully deflected against another set of two kinematic supports 17 on another set of two electrodes 20, the intervening electrodes 20 are energized in succession, stopping at the electrode 20 corresponding to the desired location.

Figure 8:
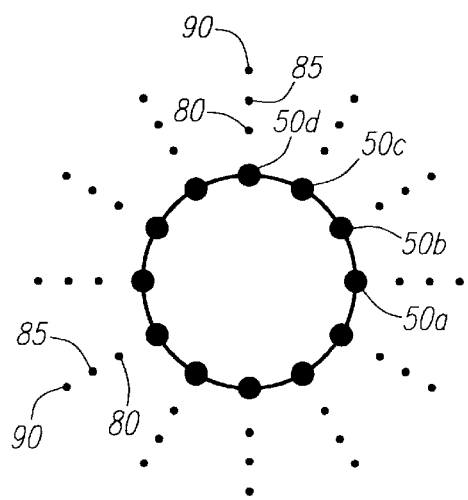
FIG. 8 illustrates reflected light directions provided by an embodiment of the invention wherein the pivotable element forms a mirror and light impinges the mirror element substantially normal to the baseplate.

Assuming a light beam incident onto the center of the reflecting surface 46 and normal to the platform 25, the reflected light beam will thus point to discrete locations 50 on an imaginary plane that is parallel to the platform 25 as indicated in FIG. 8. For example, referring as well to FIGS. 1, 2, 4 and 7, if the mirror element 14 is fully deflected against the two kinematic supports 17 on electrode 20a, the reflected light beam will be incident at location 50a. Similarly, the kinematic supports 17 at each end of the electrodes 20b, 20c, and 20d correspond to locations 50b, 50c, and 50d, respectively. Thus, the mirror 14 may direct light in a relatively large number of directions arranged in a cone-like fashion as given by polar coordinates. It will be appreciated that the light can be directed in symmetries that are different from a perfect cone, however. For example, should the pillar 30 not be located at the center of the mirror 14, many different symmetries may be swept through as the mirror 14 deflects through all the linear segments 31 of the perimeter 32 of the platform 25. In addition, rather than using a symmetric polygon shape for the perimeter 32 of the platform 25, a non-symmetric polygon shape could be used to affect the directions of the reflected light beams.

Figure 9:
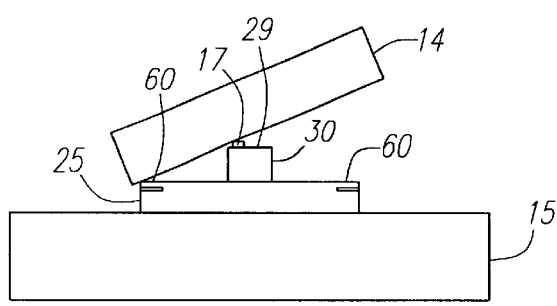
FIG. 9 is a side view of an optical element having a platform with flexures.
Figure 10:
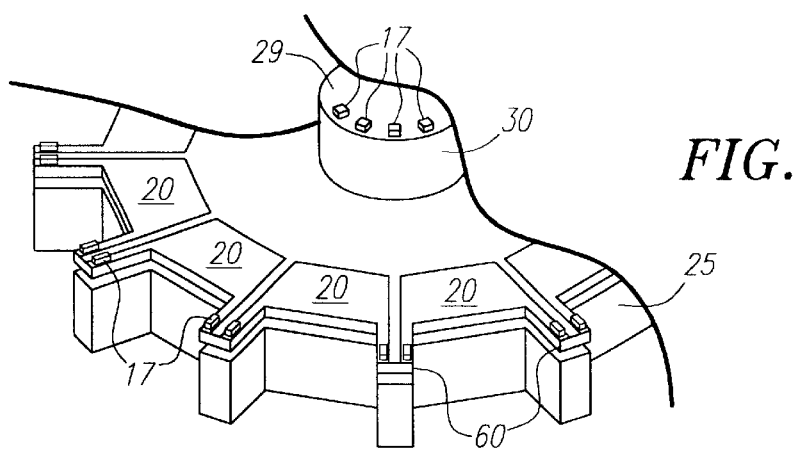
FIG. 10 is a perspective view of a portion of the optical element of FIG. 9.

Referring to FIGS. 9–10, a number of flexures 60 may be provided, where each flexure 60 corresponds to a kinematic support 17 on an electrode 20. One or more flexures 60 may be provided on the upper surface 29 of the pillar 30, in addition to or instead of the flexures 60 on the platform 25. Each flexure 60 on the upper surface 29 of the pillar 30 corresponds to a kinematic support 17. Each flexure 60 is a thin piece of material cantilevered outward from a base. The compliance of each flexure 60 is a function of its size, thickness, and material composition. Thus, the flexures 60 can be constructed to provide a desired amount of compliance by varying one or more of these characteristics. The characteristics of the electrodes 20 extending onto the corresponding flexures 60 are taken into account when determining the compliance of the flexures 60 themselves.

Where the kinematic supports 17 are located on the electrodes 20, the flexures 60 are cantilevered outward from the platform 25. The flexures 60 on the platform 25 have surfaces substantially co-planar with the surface of the platform 25, where the flexures 60 are thinner than the platform 25 and extend outward therefrom. The electrodes 20 extend onto the surface of the flexures 60. One kinematic support 17 is positioned on the portion of each electrode 20 that extends onto each flexure 60. The flexures 60 may extend outward from the platform 25 from the locations where the vertices 33 of the platform 25 would be, absent the flexures 60. Consequently, the perimeter 32 of the platform 25 does not form vertices 33, but rather extends around the flexures 60.

Flexures 60 similarly may be provided on the pillar 30. Such flexures 60 on the pillar 30 may take a form similar to that described above with respect to the flexures 60 associated with the platform 25. Flexures 60 on the pillar 30 may be used in addition to, or instead of, flexures on the platform 25.

In another embodiment, one or more of the kinematic supports 17 are composed of compliant material. Separate flexures 60 need not be used if the kinematic supports 17 are compliant. Whether flexures 60 are used to introduce compliance, or compliant material is used for the kinematic supports 17, such compliance may be substantially linear, such that hysterisis is substantially absent, and permanent deformation does not occur. Alternately, the flexures 60 may be constructed to allow for permanent deformation in certain circumstances.

Because the flexures 60 are compliant, they allow the associated kinematic supports 17 to move a selected amount, such that fine adjustments can be made to the position of the mirror 14 after it has been snapped down. Small changes in the angle of the mirror 14 in the snap-down position can be made by changing the voltage on one or more of the electrodes 20 on the platform 25. For example, where two kinematic supports 17 are provided on each electrode 20, increasing the voltage on the electrode 20 directly underneath the mirror 14 would increase the force exerted on the mirror 14, causing the flexures 60 under the two kinematic supports 17 on the platform to deflect, such that the angle of the mirror 14 is altered. The flexures 60 and electrodes 20 are calibrated relative to one another such that the application of a particular voltage to an electrode results in a known and predictable deflection of the flexures 60, and hence the mirror 14. As another example, where two kinematic supports 17 are provided on each electrode 20, voltage is applied to an electrode 20 adjacent to the electrode 20 directly underneath the mirror 14. This voltage exerts a lateral force on the mirror 14, causing one or both flexures 60 under the two kinematic supports 17 on the platform to deflect, such that the angle of the mirror 14 is altered. Thus, the application of voltage to an electrode or electrodes, over and above the normal voltage applied to snap down the mirror 14, can be used to adjust the angle of the mirror 14.

In another embodiment, one or more kinematic supports 17 may be moved a selected amount by the application of an actuation force, without the use of flexures 60. Such an actuation force may be a piezoelectric force. As an example, a layer of piezoelectric material (not shown) is formed under the kinematic supports 17. If the kinematic supports 17 are placed on electrodes 20, then an insulative layer may be laid down between the piezoelectric layer and the electrode 20, as needed. A conductive trace (not shown) is laid down on the platform 25, where that trace is connected to the piezoelectric layer. By applying voltage to the piezoelectric layer, an actuation force is provided on the corresponding kinematic support 17, thereby moving the mirror 14 a selected amount when the mirror 14 is in the snap-down position. The use of a piezoelectric layer in combination with a kinematic support 17 is particularly suited to use with a configuration such as shown in FIG. 22, in which the kinematic supports 17 are separate from the electrodes 20.

Many other embodiments of the invention are possible. For example, in one embodiment, kinematic supports 17 are placed on the underside of the mirror 14, instead of on the platform 25 or the upper surface 29 of the pillar 30. The surface of each support facing away from the underside of the mirror 14 may be substantially parallel to the underside of the mirror 14. Flexures 60 may be provided on the mirror 14 in association with one or more of these kinematic supports 17. The kinematic supports 17 and flexures 60 on the mirror are substantially as described above with regard to the corresponding structures on the platform 25 and the upper surface 29 of the pillar 30, and serve substantially the same functions and operate in substantially the same manner.

Figure 11:
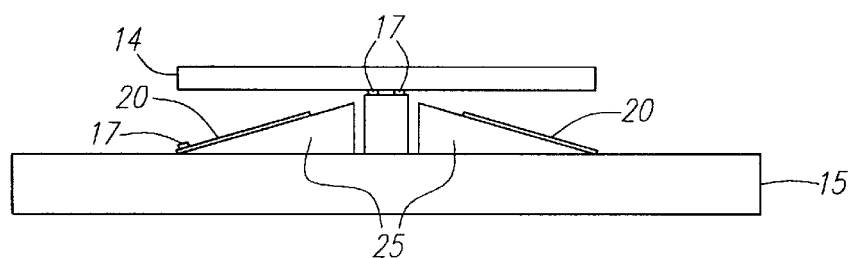
FIG. 11 is a side view of an embodiment of a pivotable element having a sloped platform, showing an element in a neutral position.
Figure 12:
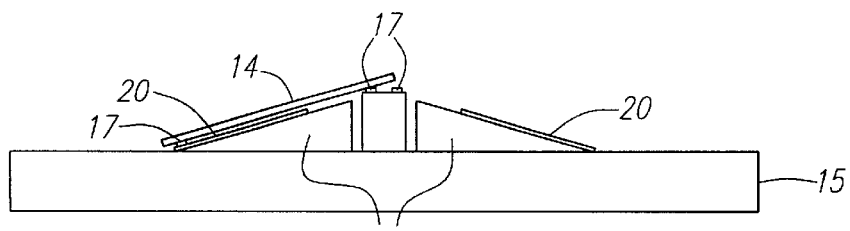
FIG. 12 is a side view of an embodiment of a pivotable element having a sloped platform, showing an element in a snapped-down position.

Referring to FIGS. 11–12, in one embodiment, the platform 25 slopes downward from the pillar 30. The platform 25 thus has a conical or a polygonal pyramidal shape. Electrodes 20 are placed on the surface of the platform, with one or more kinematic supports 17 on each electrode 20. By sloping the platform 25, the gap between the mirror 14 and each electrode 20 is reduced, thereby reducing the voltage required to snap down the mirror 14 onto a set of kinematic supports 17. In one embodiment, the platform 25 is sloped such that the underside of the mirror 14 is substantially parallel to the surface of the platform 25 when the mirror 14 is in a snapped down position. Kinematic supports 17 and/or flexures 60 may be used directly on the platform 25, and/or the upper surface 29 of the pillar 30 in this embodiment, in the same manner as described above.

Figure 13:
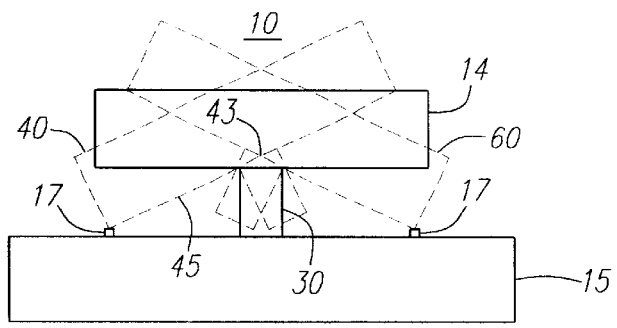
FIG. 13 is a side view of an embodiment of a pivotable element having a baseplate without a platform.

Referring to FIG. 13, in another embodiment the baseplate 15 does not have a platform 25. The electrodes 20 and associated kinematic supports 17 are provided on the surface of the baseplate 15, and the mirror 14 deflects against the kinematic supports 17. The kinematic supports 17 are positioned and sized to prevent the mirror 14 from contacting the baseplate 15 when in the snapped down position.

Figure 14:
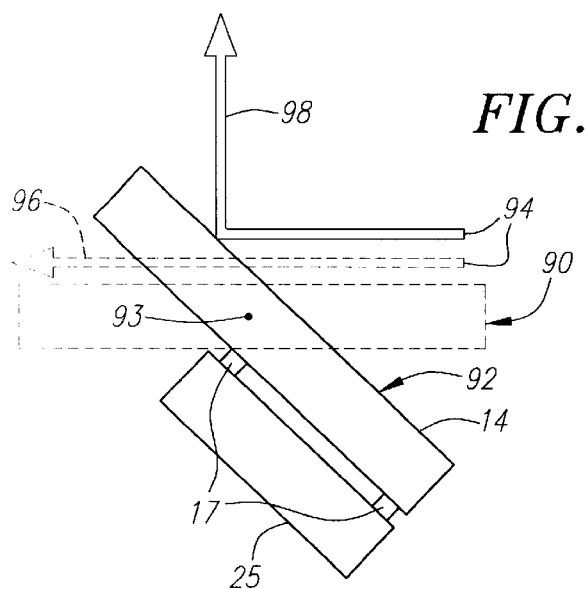
FIG. 14 is a side view of an embodiment of a pivotable element having a mirror and a platform, and a single snapped-down position.
Figure 15:
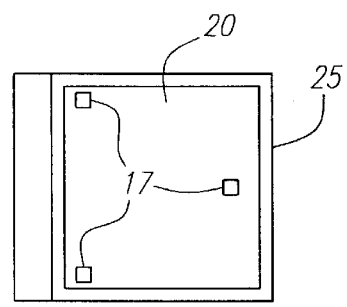
FIG. 15 is a top view of the platform of FIG. 14.

Referring to FIGS. 14–15, an embodiment is shown wherein the mirror 14 has a single snapped down position on a platform 25. That is, the mirror 14 can move between a neutral position 90 (shown in dashed lines) and a single snapped-down position 92. The platform 25 has a substantially rectangular surface in this embodiment, such that the platform 25 is a substantially rectangular solid. In the neutral position, a light beam 94 travels along a first path 96, as shown in dashed lines. In the snapped-down position, the light beam 94 reflects off the mirror 14 and travels along a second path 98. Three kinematic supports 17 may be provided on the electrode 20 on the platform 25, or on the platform 25 itself. The mirror 14 pivots about a pivot point 93 and comes to rest on the three kinematic supports 17. Alternately, two kinematic supports 17 are provided on the electrode 20 or on the platform 25 itself, with a third kinematic support 17 placed on a pillar (not shown) such as described with regard to previous embodiments, or on another structure. The platform 25 is angled such that its upper surface is substantially parallel with the underside of the mirror 14 when the mirror 14 is in the snapped-down position. Alternately, the platform 25 may be angled differently.

Figure 16:
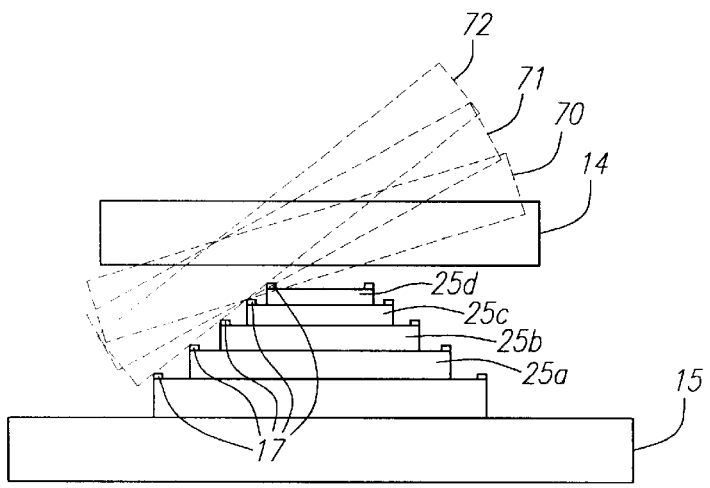
FIG. 16 is a side view of an element pivotably mounted on a baseplate having a plurality of platforms.
Figure 17:
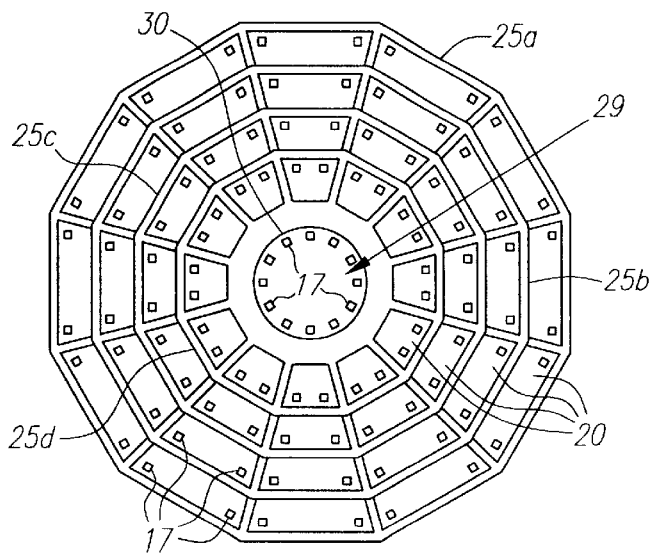
FIG. 17 is a top view of the plurality of platforms of FIG. 16.

Referring to FIGS. 16–17, an embodiment with four nested platforms 25a, 25b, 25c, and 25d is shown. More or fewer nesting platforms 25 may be provided, if desired. Each platform 25 is smaller than the one below it. For example, the platform 25d is smaller than the platform 25c below it and on which it is positioned. A range of deflection angles is provided, based upon which platform 25a–d the mirror element 14 is deflected against. Each platform 25 has a number of kinematic supports 17, which may be positioned atop flexures 60, as described above. For example, should the mirror element 14 deflect against platform 25d, the mirror 14 may assume the position indicated by the dotted line 70, where the angle of the mirror 14 is determined by the two kinematic supports 17 on the platform 25d and the corresponding kinematic support 17 on the upper surface 29 of the pillar 30. As another example, should the mirror element 14 deflect against baseplate 25c, the mirror 14 assumes the position indicated by the dotted line 71, where the angle of the mirror 14 is determined by the two kinematic supports 17 on the platform 25c and two kinematic supports 17 on the platform 25d. As another example, should the mirror element 14 deflect against baseplate 25a, the mirror 14 assumes the position indicated by the dotted line 72.

Each platform 25a–d has electrodes 20 arranged as discussed with respect to FIG. 2. Thus, depending on which particular electrode 20 is charged, the mirror element 14 snaps down onto the kinematic supports 17 associated with that electrode. 20. For movement of the mirror element 14 from linear segment to linear segment within a given platform, charging and grounding of electrodes 20 is performed as described above. Thus, should the mirror element 14 be deflected onto platform 25d, the directions a reflected light signal could be directed by mirror element 14 onto an imaginary plane parallel to baseplate 15 may be as shown by points 50 in FIG. 8. Similarly, should the mirror element 14 be deflected on platform 25c, the directions a reflected light signal could be directed by mirror element 14 may be as shown by points 80, and so on for points 85 corresponding to platform 25b and points 90 for platform 25a.

In another embodiment, by stacking pivoting elements, greater flexibility in switching directions may be achieved. For example, FIG. 18 shows the baseplate 15 of the pivoting element 10 itself pivotably mounted on a baseplate 200. Analogous to the embodiment of FIG. 1, the baseplate 200 forms a platform 206 and pillar 210. The perimeter of platform 206 has a plurality of linear segments such as shown in FIG. 2. In addition, the surface of the platform 206 facing the baseplate 15 includes electrodes as shown in FIG. 2. These electrodes are used to snap down the baseplate onto the baseplate 200. A number of supports may be provided on the platform 206 and/or the pillar 210, analogous to the supports and their positioning as described above. Such supports may be provided on, or separate from, the electrodes on the surface of the platform 206. Further, flexures may be provided in association with the platform 206 and/or the pillar 210, analogous to the flexures described above. Electrical connections are made to the electrodes 20 on the platform 25 on the baseplate 15, such that the mirror 14 can be snapped down. These electrical connections may be made through the pillar 210, through a suspension mechanism as described below, or through wires or other conductors extending between the electrodes 20 and a voltage source. The use of such a stacked design provides a compact device that does not require significantly more area on a surface than a single stage movable mirror 14. Further, additional control over the light paths is thus provided, and fewer positions need to be controlled. That is, if the mirror 14 is capable of assuming M positions, and the baseplate 15 is capable of assuming N positions, M*N outgoing light paths are possible, but only M+N positions need be controlled to produce those light paths. The embodiment shown in FIG. 18 may be varied in the same manner that the pivoting element 10 may be varied, as described above.

In another embodiment, referring to FIG. 19, two separate pivoting elements 10 are utilized in conjunction with one another for reflecting incident light. The pivoting elements 10 are constructed as described above. Light is received at a first mirror 100, which may be in a snapped-down position. That light is reflected from the first mirror 100 to a second mirror 102, which maybe in a snapped-down position. That light is then reflected along an outgoing path. Alternately, the mirrors 100, 102 may be positioned in substantially the same plane, where a passive mirror (not shown) is provided to reflect light from one to the other. The possible outgoing light paths are determined based on the initial path of incident light onto the first mirror 100, the relative positions of the two separate pivoting elements 10, and the possible positions of the mirrors 100, 102. Additional control over the light paths is thus provided, and fewer positions of the mirrors 100, 102 need to be controlled. That is, if the first mirror 100 is capable of assuming M positions, and the second mirror 102 is capable of assuming N positions, M*N outgoing light paths are possible, but only M+N mirror positions need be controlled to produce those light paths. More than two stages may be utilized, where each mirror is a stage. For example, using three stages with N, M and U positions per stage, N*M*U outgoing light paths are possible, but only N+M+U mirror positions need to be controlled to produce those light paths.

In another embodiment, referring to FIGS. 20–21, the platform 25 includes a number of kinematic supports 17 positioned directly on its surface. The platform 25 has a polygonal perimeter 32 having a number of vertices 33, where a kinematic support 17 is located at or near each vertex 33. The shape and construction of the kinematic supports 17 are substantially as described above. The kinematic supports 17 may be positioned between the electrodes 20 and the perimeter 32 of the platform 25. Alternately, the kinematic supports 17 may be placed between the electrodes 20 on the platform 25.

The perimeter 32 of platform 25 may have a polygonal shape, wherein each linear segment 31a, 31b, etc., corresponds to a particular electrode 20 on the platform 25. For example, if a charge exists on electrode 20a, the mirror element 14 will fully deflect toward linear segment 31a, snapping down onto the kinematic supports 17 at each end of the linear segment 31a that corresponds to the electrode 20a. Similarly, if a charge exists on electrode 20b, the mirror element 14 will fully deflect toward linear segment 31b, snapping down onto the kinematic supports 17 at each end of the linear segment 31b that corresponds to the electrode 20b, and so on. Thus, snapdown and control of the mirror 14 are substantially as described above.

In this embodiment, the kinematic supports 17 may be conductive, such that they may be electrically biased at a different potential than the electrodes 20. The kinematic supports 17 may be grounded, such that the mirror 14 is grounded upon being snapped down onto the kinematic supports 17. Further, the kinematic supports 17 may be individually connected to conductive elements connected to a sensor or other circuitry. In this way, the position of the mirror 14 may be determined electrically, by determining which kinematic supports 17 on the platform 25 are in contact with the mirror 14 when the mirror 14 is in a snapped down position. Determining the position of the mirror 14 may be performed by biasing one or more kinematic supports 17 and determining when a circuit is closed by contact between the mirror 14 and the kinematic supports 17, or by another method. Conductive traces (not shown) on the platform 25 may be used to connect each kinematic support 17 to a voltage source, to ground, or to another electrical element, as desired. The conductive traces do not contact the electrodes 20. Alternately, one or more of the conductive traces contact one or more of the electrodes 20. The formation of such conductive traces is standard to those skilled in the art. Further, higher voltages may be applied to the electrodes 20 without electrical breakdown to the mirror 14. Where the kinematic supports 17 are placed on the electrodes 20, the voltage is controlled to remain beneath the electrical breakdown voltage of the material from which the kinematic supports 17 are formed. When that material is oxide, that electrical breakdown voltage is approximately 500 V/micron, such that the potential between the mirror 14 and the electrodes 20 is controlled to remain beneath that value. In this embodiment, where the kinematic supports 17 are positioned on the platform 25 independent from the electrodes 20, and may be conductive, the potential between the mirror and the electrodes 20 can be increased beyond the constraints of the embodiment in which the kinematic supports 17 are placed on the electrodes 20.

In this embodiment, the mirror 14 is grounded through a suspension that is described in greater detail below, rather than through the pillar 30. In another embodiment, the mirror 14 has a floating potential, and is only grounded when it touches down on the kinematic supports 17. That is, the mirror 14 is floating because it is not at a known potential, because it does not have a low resistance path to ground. The potential on one or more energized electrodes 20 attracts the mirror 14 into a snapped-down position, in which the mirror 14 then has a low-resistance path to ground through the kinematic supports 17. Alternately, the mirror 14 can be grounded through the kinematic support on the pillar 30, as mentioned above. In another embodiment, the kinematic supports 17 are biased at a voltage that is different from the bias voltage applied to the mirror 14 and/or the electrodes 20. This produces an attractive force between the kinematic supports 17 and the mirror 14 that maintains the position of the mirror 14 in the absence of an attractive force exerted by one or more of the electrodes 20.

A number of flexures 60 may be provided on the platform 25, where each flexure 60 corresponds to a kinematic support 17. One or more flexures 60 may be provided on the upper surface 29 of the pillar 30, in addition to or instead of the flexures 60 on the platform 25. Each flexure 60 on the upper surface 29 of the pillar 30 corresponds to a kinematic support 17. The flexures 60 are independent from the electrodes 20. Further, each flexure 60 is directly connected to a kinematic support 17. Otherwise, the flexures 60 are formed and operated substantially as described above.

In another embodiment, referring to FIG. 22, the kinematic supports 17 are all located on the platform 25, separate from the electrodes 20. The surface of each kinematic support 17 may be substantially coplanar with the surface of the electrodes 20, as shown in FIG. 22. The mirror 14 is fixed to the pillar 30. The pillar 30 contacts a single central kinematic support 17, and tilts relative to that kinematic support 17 during snapdown. During snapdown, a bottom surface 31 of the pillar 30 contacts an edge of the central kinematic support 17, and the bottom surface of the mirror 14 contacts an edge of two different kinematic supports 17. In this embodiment, a single kinematic support 17 is used in conjunction with the pillar 30, rather than a numbers of different kinematic supports 17, simplifying construction and operation of the pivoting element 10.

It will be appreciated that, should the mirror 14 be mounted within a suspension, the figures described above do not illustrate the wafer in which the suspension is mounted. Referring to FIG. 23, in one embodiment the mirror element 14 is formed from a planar silicon wafer 200 polished on both sides to achieve good parallelism. The thickness of the wafer 200 affects the surface flatness of reflecting surface 46 of the mirror 14 because a metallic or multilayer dielectric coating may be deposited on it. The wafer 200 need not be as thick as a standard silicon wafer, particularly where a coating is used to enhance its reflectivity.

The mirror 14 is mounted within wafer 200 by a suspension formed by springs 205. The particular structure and configuration of the springs 205 is not critical to the invention. Any structure that allows for snap down of the mirror 14 and for return of the mirror 14 to a neutral position may be used. An exemplary set of hemispherical springs 205 is described here, but the springs 205 are not limited to such a configuration. The springs 205 may be formed using photolithography and etched using STS, which is a deep reactive ion etching (RIE) technology. Because the exact spring constant is of little importance due to the snap-down (fully deflected) actuation of the invention, the springs 205 may be made relatively thin. FIG. 24 shows a cross-section view of a spring 205. To reduce the spring stiffness, the spring 205 is undercut using STS etching. It will be appreciated that the parameters of the STS etching may be modified to achieve other cross-sections for spring 205. In embodiments of the invention wherein the mirror 14 is preloaded, such preloading may be achieved by mounting the mirror 14 onto the platform such that the wafer 200 (onto which the mirror element is attached via the springs 205) contacts the baseplate while the element 14 is supported above the platform 25 by the pillar 30. The total mechanical preload in such an embodiment is equal to the height of the platform 25 and the height of the pillar 30. It will be appreciated that the pillar 30 may be an element of the suspension by constructing the pillar 30 from a material having a suitable bending stiffness.

In another embodiment, referring to FIG. 25, a number of different mirrors 14 are utilized within a pivoting element 10. The mirrors 14 form a switching array that may include any number of mirrors 14. While three mirrors 14 are shown, more may be utilized. The array of mirrors 14 may be formed by mirrors of any one or more embodiments described above. As in the embodiments shown in FIGS. 13 and 22, the pillar 30 is integral with the mirror 14. However, the mirror 14 instead may be pivotable relative to the pillar 30, with one or more kinematic supports 17 atop the pillar. Further, as in the embodiment of FIGS. 14–15, each of the mirrors 14 has a single snap-down position, for ease of description. However, each of the mirrors 14 may have two or more snap-down positions, if desired. As shown in FIG. 25, the mirrors 14 are deflected to fixed, preselected angles using the kinematic supports 17, without the use of electronics. Instead, the mirrors 14 are mechanically deflected into a snap-down position by mechanical preloading, such as by one or more springs 205 as described above. In this way, the spring or springs 205 are displaced during assembly of the pivoting element 10 in order to provide a downward force on the mirrors 14 that biases them into contact with the kinematic supports 17 on the baseplate 15. Constructing an array of mirrors 14, each having a single fixed position, may be simpler to perform in this manner than by micromachining or otherwise manufacturing an array of mirrors on a substrate.

In the side view of FIG. 25, the single kinematic support 17 under each pillar 30 is shown. For clarity, only one of the two kinematic supports 17 that contacts each mirror 14 is shown, because the other kinematic support 17 is located directly behind the kinematic support 17 that is shown. As illustrated in FIG. 25, the distance between the kinematic supports 17 affects the snap-down position of the mirror 14, allowing for control over snap-down position by selection of the relative position of the kinematic supports 17 during construction of the pivoting element 10. A first mirror 110 is associated with kinematic supports 17 separated by a first distance 120. The first distance 120 is the distance between the central kinematic support 17, which in the embodiment shown is the kinematic support 17 located under the pillar 30, and the kinematic supports 17 that touch the first mirror 110. In the embodiment shown, the first distance 120 is the same between the central kinematic support 17 and each of the other two kinematic supports 17 associated with the first mirror 110. However, the distance between the central kinematic support 17 and each of the two other kinematic supports 17 associated with a mirror 14 need not be the same; different distances may be used in order to provide a desired snap-down position for the mirror 14. As shown in FIG. 25, the first distance 120 is relatively large, such that the first mirror 110 forms a relatively shallow angle relative to the platform 25 when in the snapped-down position.

A second mirror 112 is associated with kinematic supports 17 separated by a second distance 212. The second distance 212 is the distance between the central kinematic support 17, which in the embodiment shown is the kinematic support 17 located under the pillar 30, and the kinematic supports 17 that touch the second mirror 112. The second distance 212 is shorter than the first distance 210. Thus, the second mirror 112 forms a larger angle relative to the platform 25 when in the snapped-down position than does the first mirror 110. To accommodate the second mirror 112 when in snapped-down position, a notch 216 is formed in the platform 25 such that an end of the second mirror 112 can enter the notch 216 rather than collide with the surface of the platform 25. Rather than providing a notch 216, the second mirror 112 may be constructed to be shorter than the first mirror 110, such that the overhang past the two kinematic supports 17 that contact the second mirror 112 is eliminated.

A third mirror 114 is associated with kinematic supports 17 separated by a third distance 214. The third distance 214 is the distance between the central kinematic support 17, which in the embodiment shown is the kinematic support 17 located under the pillar 30, and the kinematic supports 17 that touch the third mirror 114. The third distance 214 is shorter than both the first distance 210 and the second distance 212. Thus, the third mirror 114 forms a larger angle relative to the platform when in the snapped-down position than does either the first mirror 110 or the second mirror 112. To accommodate the third mirror 114 when in snapped-down position, a notch 216 is formed in the platform 25 such that an end of the third mirror 114 can enter the notch 216 rather than collide with the surface of the platform 25. Rather than providing a notch 216, the third mirror 114 may be constructed to be shorter than the first mirror 110 or second mirror 112, such that the overhang past the two kinematic supports 17 that contact the third mirror 114 is eliminated.

As shown in this example, the snap-down position of a mirror 14 can be controlled by selecting a particular distance between a central kinematic support 17 and the two other kinematic supports 17 that together determine the plane occupied by the mirror 14 in a snapped-down position. By controlling that snap-down position, the direction of light beams 218 or other electromagnetic radiation reflected from the mirrors 14 can be controlled as well.

Further, this example demonstrates that the mirror 14 can be biased against the kinematic supports 17 in a number of different ways. The examples provided above show that the mirror 14 can be biased against the kinematic supports 17 by energizing an electrode 20 under the mirror 14, thereby generating an electrostatic force that acts on the mirror 14, or by mechanically preloading the mirror 14, thereby generating a mechanical force that acts on the mirror 14. Other structures and/or mechanisms may be used to bias the mirror 14 toward the kinematic supports 17. For example, the mirror 14 may have magnetic characteristics, such that a magnetic force biases the mirror. 14 toward the kinematic supports 17. As another example, simple gravitational force may bias the mirror 14 downward into contact with the kinematic supports 17.

In another embodiment, the mirror 14 snaps down to a number of different snap-down positions on the platform 25 or onto the baseplate 15, where at least one of these snap-down positions is not formed by kinematic supports 17 Instead, at least one of those snap-down positions is formed in another way, such as by contact between an edge of the mirror 14 and the platform 25 or baseplate 15. As another example, a snap-down position could be formed by deflecting the mirror 14 to a position in space where it is not in contact with the platform 25 or the baseplate 15 at all. In such an embodiment, the kinematic supports 17 are utilized for those snap-down positions where precise positioning of the mirror 14 is particularly critical, and the kinematic supports 17 are not used for those snap-down positions where precise positioning of the mirror 14 is not as critical.

The baseplate 15 (as illustrated in, e.g., FIG. 1) may be formed using two silicon wafers that are processed, bonded together, and then processed again. For an embodiment in which the pillar 30 is integral with the substrate 15, they may be formed as follows. One wafer may be a silicon-on-insulator (SOI) wafer composed of a thick substrate layer, a thin oxide epilayer, and a thin heavily doped silicon epilayer covering the oxide epilayer. This wafer is polished on both sides. The silicon epilayer is patterned with the desired electrode pattern and a thin oxide layer deposited over it. The oxide layer is patterned to define kinematic supports 17 that will be present on the surface of the platform 25. The oxide layer may be between 500–5000 Angstroms in thickness. The patterned wafer is then bonded to a second silicon wafer polished on both sides. The second wafer is then patterned to form the pillar 30. A shadow-mask evaporation is finally used to contact the silicon electrodes. The wafer 200 and the substrate 15 may then be aligned and bonded together.

As another example, the baseplate 15 (as illustrated in, e.g., FIG. 1) may be formed using two silicon wafers that are processed, bonded together, and then processed again. The first wafer is an electrode-bearing wafer and the second wafer is a pillar wafer. The electrode wafer is fabricated using an SOI wafer as described above. The silicon epilayer is patterned with the desired electrode pattern and a thin oxide layer deposited over it. The oxide layer is patterned to define kinematic supports 17 that will be present on the surface of the platform 25. The oxide layer may be between 500–5000 Angstroms in thickness. A shadow-mask evaporation is used to remove the oxide layer over the electrodes. The oxide layer is then undercut using a short oxide etch on the edge of the wafer, with or without a shadow mask or other patterning aid, resulting in an overhang of the silicon epilayer over the first oxide layer. That is, at the edge of the wafer, a space exists between the silicon epilayer and the substrate. In this way, flexures 60 are created on the wafer. A hole is etched through the wafer for receiving the pillar 30. The pillar wafer is an SOI wafer. A thin oxide layer is patterned on the backside of the wafer to define kinematic supports 17 that will be present on the upper surface 29 of the pillar 30. The pillar 30 is then patterned on the backside of the wafer. Pivots that may be utilized in conjunction with the flexures 60 on the first wafer may also be patterned on the backside of the wafer. The pillar wafer is then aligned with and bonded to the first wafer, such that the pillar 30 extends through the hole etched through the first wafer. It will be appreciated that MEMS technology provides many other processes that may be used to form the pivoting mirror of the present invention.

Although the invention has been described with reference to particular embodiments, the description is only an example of the invention's application and should not be taken as a limitation. Consequently, various adaptations and combinations of features of the embodiments disclosed are within the scope of the invention as defined by the following claims and their legal equivalents.

We claim:

1. A pivoting element, comprising:
   three kinematic supports positioned relative to a surface;
   an optical element above said surface; and
   means for biasing said optical element against said three kinematic supports to a position, wherein said three kinematic supports define a plane into which said optical element is biased.

2. The pivoting element of claim 1, wherein said means comprise an electrode on said surface.

3. The pivoting element of claim 1, wherein said means comprise at least one spring connected to said optical element.

4. The pivoting element of claim 1, wherein said means comprise mechanically preloading said optical element.

5. The pivoting element of claim 1, wherein each said kinematic support has a substantially planar surface, and wherein said kinematic supports are positioned relative to one another such that said surfaces lie in substantially the same plane.

6. The pivoting element of claim 1, further comprising at least one additional kinematic support, whereby at least one different said position is defined.

7. The pivoting element of claim 1, wherein said pivot point comprises a pillar comprising an upper surface.

8. A pivoting element, comprising:
   a platform comprising a surface;
   a pivot point extending from said platform;
   an optical element pivotally mounted on said pivot point; and
   at least two kinematic supports raised relative to said surface of said platform,
   wherein said optical element defines a position when in contact with two said kinematic supports and said pivot point.

9. The pivoting element of claim 8, wherein said pivot point is a pillar comprising an upper surface.

10. The pivoting element of claim 9, further comprising at least one kinematic support positioned on said upper surface of said pillar.

11. The pivoting element of claim 10, wherein each said kinematic support is a substantially polygonal solid comprising an upper surface and at least one edge, said upper surface substantially parallel to the surface of said platform.

12. The pivoting element of claim 10, wherein each said kinematic support is a substantially rectangular solid comprising an upper surface and at least one edge, said upper surface substantially parallel to the surface of said platform.

13. The pivoting element of claim 8, further comprising at least one electrode placed on the surface of said platform facing said optical element.

14. The pivoting element of claim 13, wherein two said kinematic supports are positioned on each said electrode.

15. The pivoting element of claim 14, wherein said optical element contacts said edge of each of two said kinematic supports on one said electrode and onto said edge of one corresponding said kinematic support on said upper surface of said pillar.

16. The pivoting element of claim 14, wherein said pivoting element contacts said upper surface of each of two said kinematic supports on one said electrode and onto an edge of one corresponding said kinematic support on said upper surface of said pillar.

17. The pivoting element of claim 13, wherein one said kinematic support is positioned on each said electrode.

18. The pivoting element of claim 17, wherein said optical element contacts said edge of one kinematic support on each of two adjacent said electrodes and onto said edge of one corresponding said kinematic support on said upper surface of said pillar.

19. The pivoting element of claim 17, wherein said optical element contacts said upper surface of one kinematic support on each of two adjacent said electrodes and onto said edge of one corresponding said kinematic support on said upper surface of said pillar.

20. The pivoting element of claim 13, wherein said kinematic supports raised relative to said surface of said platform are positioned directly on said platform adjacent said at least one electrode.

21. The pivoting element of clam 20, wherein said kinematic supports are positioned between said electrodes.

22. The pivoting element of claim 20, wherein said optical element snaps down onto said edge of two kinematic supports adjacent one said electrode and onto said edge of one corresponding said kinematic support on said upper surface of said pillar.

23. The pivoting element of claim 20, wherein said optical element snaps down onto said upper surface of two kinematic supports adjacent one said electrode and onto said edge of one corresponding said kinematic support on said upper surface of said pillar.

24. The pivoting element of claim 13, furthest comprising a plurality of flexures on said platform, wherein each said electrode extends onto at least one said flexure, and wherein each said kinematic support is positioned above one said flexure.

25. The pivoting element of claim 24, wherein each said flexure is cantilevered from said platform.

26. The pivoting element of claim 13, wherein said platform and said electrodes slope downward and away from said pivot point.

27. The pivoting element of claim 13, further comprising:
at least one additional platform on said baseplate, wherein each said additional platform is located between said optical element and said baseplate, and wherein each said platform is smaller than said platform below it;
a plurality of electrodes arranged on the surface of each said additional platform facing said optical element; and
at least one kinematic support placed on the surface of each said electrode.

28. The pivoting element of claim 10, wherein each said kinematic support is a substantially polygonal solid comprising a substantially planar upper surface angled relative to the surface of said platform, wherein said optical element snaps down onto said upper surface of each of three said kinematic supports.

29. The pivoting element of claim 28, wherein two said kinematic supports are positioned on each said electrode.

30. The pivoting element of claim 28, wherein one said kinematic support is positioned on each said electrode.

31. The pivoting element of claim 28, wherein said kinematic supports raised relative to said surface of said platform are positioned directly on said platform adjacent said electrodes.

32. The pivoting element of claim 8, wherein said optical element is a mirror.

33. The pivoting element of claim 8, further comprising a baseplate comprising an upper surface, said platform positioned on said upper surface of said baseplate.

34. The pivoting element of claim 8, wherein said platform is substantially polygonal.

35. The pivoting element of claim 8, wherein said platform is substantially rectangular.

36. The pivoting element of claim 8, further comprising
a second baseplate; and
a second pivot point extending from said second baseplate, said baseplate pivotally mounted on said second pivot point.

37. A pivoting element, comprising:
a platform comprising a surface;
a pivot point extending from said platform;
an optical element pivotably mounted on said pivot point, said optical element having an underside;
at least one electrode placed on the surface of said platform facing said optical element; and
at least two kinematic supports raised relative to said underside of said optical element.

38. The pivoting element of claim 37, wherein said optical element defines a snap-down position when two said kinematic supports contact at least one said electrode.

39. The pivoting element of claim 37, wherein said optical element defines a snap-down position when two said kinematic supports contact said surface of said platform.

40. A pivoting element, comprising:
a platform comprising a surface;
an optical element;
a pillar extending from said optical element, said pillar pivotably mounted on said platform;
a plurality of electrodes arranged on the surface of said platform facing said optical element; and
a plurality of kinematic supports positioned between said optical element and said platform.

41. The pivoting element of claim 40, wherein said kinematic supports are positioned on said underside of said optical element facing said platform.

42. The pivoting element of claim 41, further comprising a plurality of flexures on said underside of said optical element, each said flexure associated wit a kinematic support.

43. The pivoting element of claim 40, wherein said kinematic supports are raised relative to said platform.

44. The pivoting element of claim 43, wherein said kinematic supports are positioned on said electrodes.

45. The pivoting element of claim 43, wherein said kinematic supports are positioned on said platform.

46. A pivoting element, comprising;
a platform comprising a surface;
a pivot point extending from said platform;
an optical element pivotably mounted on said pivot point;
at least one electrode placed on said surface of said platform facing said optical element; and
at least two kinematic supports displaced from said surface of said platform, each said kinematic support having a support surface substantially coplanar with said surface of said at least one electrode,
wherein said optical element defines a snap-down position when in contact with two said kinematic supports.

47. An optical switching array, comprising:
a plurality of pivoting elements, each said pivoting element comprising
three kinematic supports positioned relative to a surface,
an optical element above said surface, and
means for biasing said optical element against said three kinematic supports to a position, wherein said three kinematic supports define a plane into which said optical element is biased,
wherein said position of each said pivoting element is determined by said position of its corresponding said kinematic supports.

48. A method for snapping down an optical element onto kinematic supports, comprising:
biasing the optical element to a first selected voltage;
providing at least one electrode spaced apart from the optical element;
biasing at least one said electrode to a second selected voltage, wherein the optical element is induced toward said at least one electrode;
stopping said element by contact with two of the kinematic supports;
providing a plurality of flexures each associated with one kinematic support; and
controlling the position of said element by applying additional voltage to one or more said electrodes, wherein said flexures deflect by an amount related to said additional voltage.

* * * * *